Nov. 16, 1965  W. E. RISE  3,217,901
TRANSFER MECHANISM
Filed April 8, 1964  3 Sheets-Sheet 1
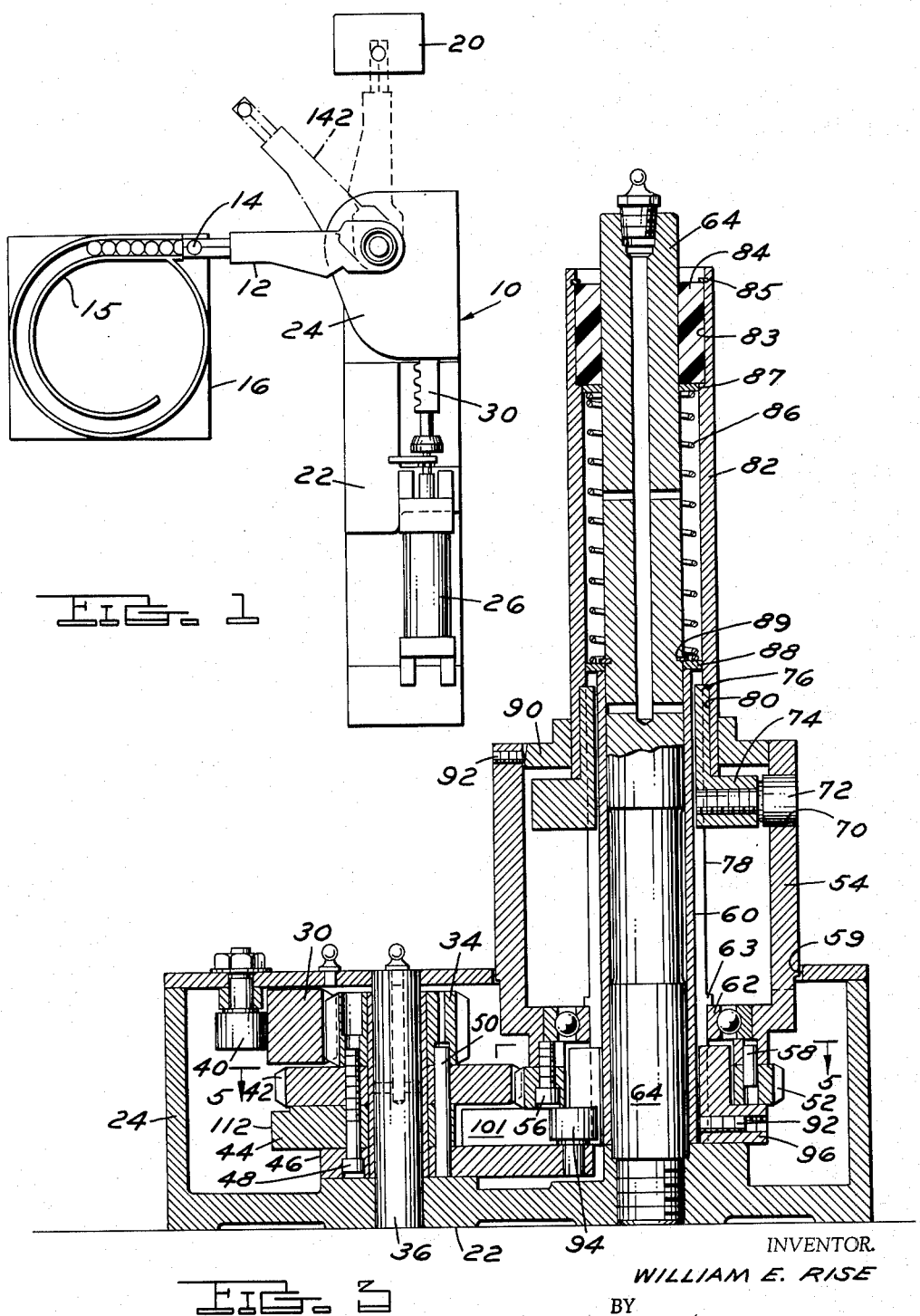
INVENTOR.
WILLIAM E. RISE
BY
Barnes, Kisselle, Raisch & Choate
ATTORNEYS

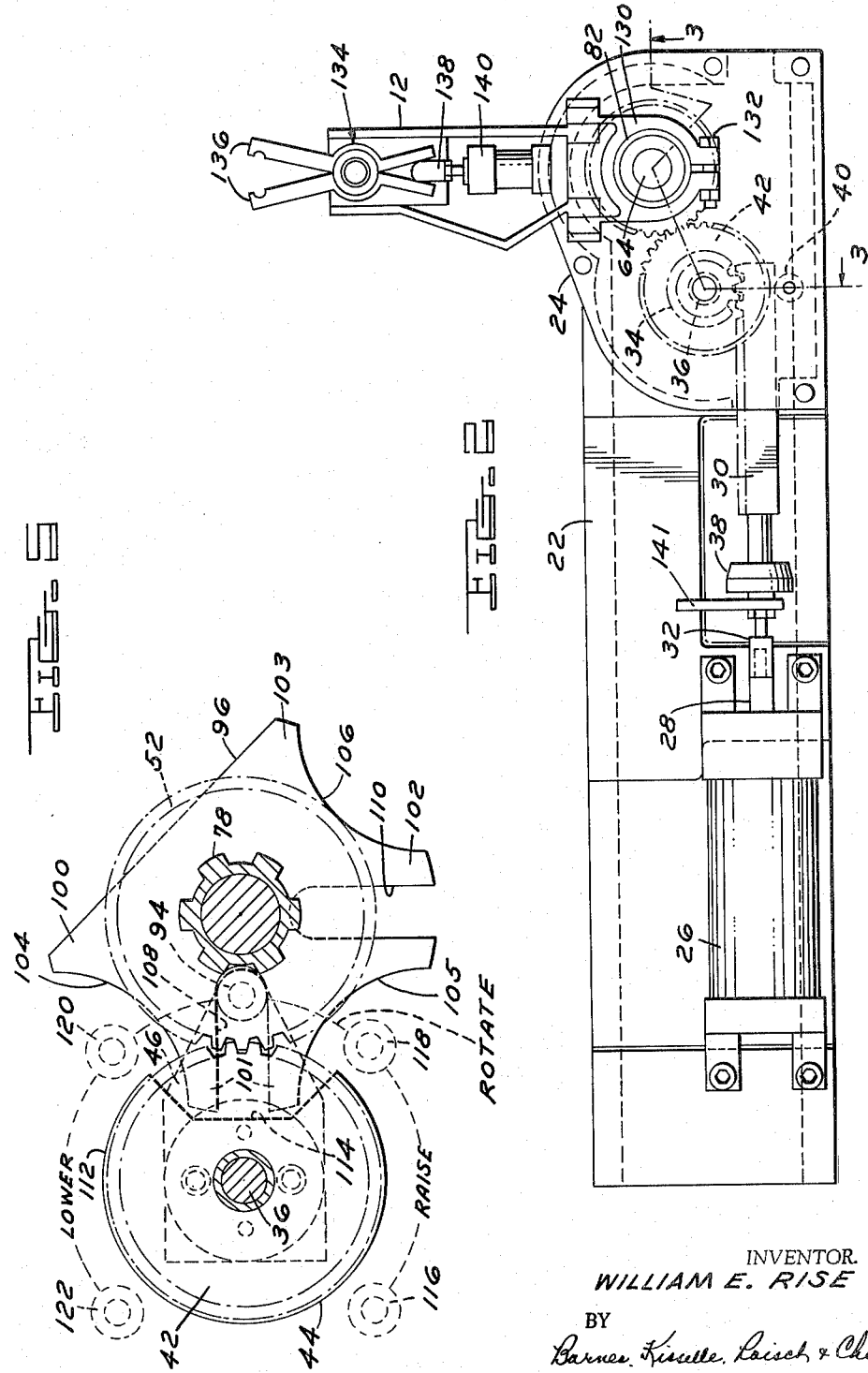

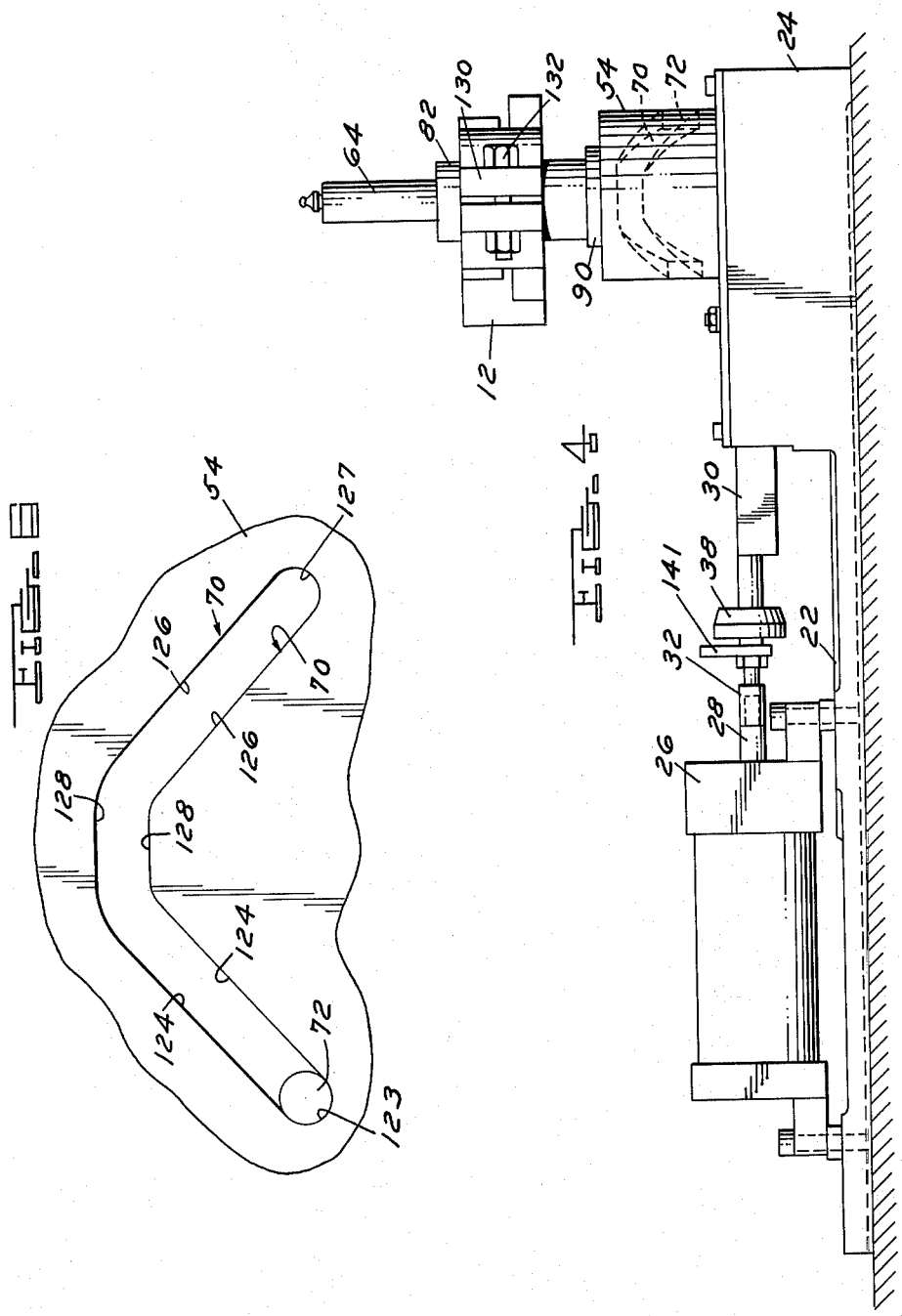

United States Patent Office 3,217,901
Patented Nov. 16, 1965

3,217,901
TRANSFER MECHANISM
William E. Rise, Grosse Pointe Farms, Mich., assignor to Analytical Industries, Inc., a corporation of Michigan
Filed Apr. 8, 1964, Ser. No. 358,157
11 Claims. (Cl. 214—1)

This invention relates to automatic material handling and in particular to a device which automatically picks up parts from one location and transfers them to another location.

The objects of this invention are to provide an automatic transfer mechanism that provides smooth, fast, and accurate operation; that is rugged and dependable to provide long, trouble-free operation; that combines easily with components of existing material handling and production facilities; and that is versatile and can be modified easily to adapt to varying job applications.

In the drawings:

FIG. 1 is a top view of one transfer mechanism constructed in accordance with this invention to transfer parts from one location to another location by a work transfer arm which rotates through ninety degrees.

FIG. 2 is an enlarged and more detailed top view of the transfer mechanism shown in FIG. 1 with the work transfer arm in a position corresponding to a load station.

FIG. 3 is an enlarged vertical section taken along the offset line 3—3 in FIG. 2 with the arm removed and the parts as they appear when the transfer arm has rotated forty-five degrees from the load station toward an unload station.

FIG. 4 is a side view taken generally in the direction looking from the right of the transfer mechanism as viewed in FIG. 1.

FIG. 5 is a sectional view taken along the line 5—5 of FIG. 3 with certain parts removed to illustrate a Geneva movement which rotates the transfer arm between the load and unload stations.

FIG. 6 is an enlarged fragmentary view showing a developed cam slot of a barrel cam used to impart vertical movement to the transfer arm at the load and unload stations.

Generally this invention contemplates a transfer mechanism 10 having a vertically movable and horizontally swingable arm 12 arranged to pick up a part 14 from a suitable feeder 15 at a load station 16, transfer or index part 14 to an unload station 20, and then set part 14 down at station 20.

Transfer mechanism 10 comprises a flat base 22 having a gear case 24 formed on one end and an air cylinder 26 bolted on the other end. Cylinder 26 has a piston rod 28 to which a rack 30 is adjustably connected as at 32. Rack 30 extends through case 24 and meshes with a pinion 34 which is journalled on a pin 36 fixed to base 22. An adjustable stop 38 locked on an ensmalled end of rack 30 limits axial movement of rack 30 to the right as viewed in FIGS. 2 and 4. A roller 40 (FIG. 3) bolted to the top of case 24 restrains lateral movement of rack 30. A gear 42, a Geneva lock wheel 44, and a Geneva arm 46, also journalled on pin 36, are fixedly mounted on pinion 34 by screws 48 and dowel pins 50. Gear 42 meshes with a gear 52 on which a cylindrical barrel cam 54 is mounted by screws 56 and dowel pins 58 at its lower ensmalled end. Cam 54 extends upward through an opening 59 in case 24 and is journalled at its lower end on a rotatable but vertically fixed sleeve 60 by a bearing 62 retained by an annular boss 63. Sleeve 60 is, in turn, rotatably supported by a stationary post 64 threaded in base 22. Cam 54 has a cam slot 70 (FIGS. 4 and 6) in which a roller 72 of a cam follower 74 rides. Cam follower 74 has an integral, cylindrical flange 76 slidably but non-rotatably connected to sleeve 60 by splines 78. Flange 76 is press fitted in a counterbore 80 at the lower end of a hollow column 82 to rigidly interconnect follower 74 and column 82. Arm 12 is clamped near the top of column 82 (FIG. 4). Column 82 has a counterbore at its upper end in which a bushing 84 is retained by a snap ring 85 to slidably and rotatably support column 82 on post 64. A compression spring 86 has its upper end bearing against bushing 84 through a washer 87 and its lower end bearing against sleeve 60 through a washer 88 which is retained on post 64 by ring 89. Column 82 is guided and supported at its lower end by a collar 90 fixedly mounted within the upper end of cam 54 by set screws 92. Arm 46 on pin 36 has a roller 94 on its outer end which is adapted to engage with a slotted Geneva index wheel 96 fixed on sleeve 60 by splines 78 and a set screw 92.

As best shown in FIGS. 3 and 5, wheel 96 has a plurality of radially spaced projections 100, 101, 102, 103 joined by respective concave surfaces 104, 105, 106. Projection 101 is enlarged and has a radial slot 108 in which roller 94 rides. For purposes of illustration, projection 102 is shown as enlarged and may also have a radial slot 110 for applications where the arm 12 swings through 180 degrees, although slot 110 and surface 106 are not used for the ninety (90) degree indexing being described. Roller 94 is mounted on the outer tapered end of arm 46. Lock wheel 44 is generally cylindrical and has a continuous surface 112 arranged to mate with concave surfaces 104, 105 and a recess 114 which accommodates projection 101. Gears 42, 52 have equal pitch-diameters. For purposes of explanation, roller 94 is shown in broken lines at positions 116, 118, 120, and 122 which correspond to start, beginning of rotation, end of rotation, and stop positions, respectively, of arm 12. As shown by the developed cam in FIG. 6, slot 70 has an end 123, upwardly inclined camming surfaces 124, downwardly inclined camming surfaces 126, an end 127 and intermediate flat surfaces 128 at the apex of surfaces 124, 126.

Transfer arm 12 has a bifurcate end 130 which is clamped on column 82 by a screw 132. Arm 12 has a suitable pick-up device 134, including scissor jaws 136 which are fixedly mounted on the other end of arm 12 to extend outward therefrom and which are actuated by the piston 138 of an air cylinder 140 mounted on arm 12 intermediate its ends. Conventional means such as microswitches (not shown) actuated by an adjustably positioned dog 141 on rack 30 control the actuation of air cylinder 26 and the stroke of rack 30.

Prior to initiating operation of transfer mechanism 10, transfer arm 12 is positioned at the load station 16 as shown in full lines in FIG. 1; barrel cam 54 is in the position shown in FIG. 4 with roller 72 at the bottom end 123 of slot 70 as shown in FIG. 6, so that column 82 and arm 12 are lowered (FIG. 4); arm 46 and lock wheel 44 are rotated clockwise approximately 135 degrees from the position shown in FIG. 5 so that roller 94 is at start position 116; wheel 96 is rotated counterclockwise approximately 45 degrees from the position shown in FIG. 5 so that surface 112 mates with surface 104 to prevent rotation of wheel 96 and so that slot 108 is positioned to receive roller 94 at position 118; and rack 30 is at its extreme left position as viewed in FIGS. 1, 2, and 4. Operation of transfer mechanism 10 is initiated by actuating air cylinder 140 to clamp part 14 in jaws 136. Air cylinder 26 is then actuated to move rack 30, toward the right as viewed in FIGS. 2 and 4, simultaneously rotating pinion 34, gear 42, lock wheel 44, and arm 46 counterclockwise as viewed in FIG. 5. During approximately the initial ninety (90) degrees of rotation, wheel 96 is locked against rotation as surface 112 slides relative to surface 104. However, gear 42 continuously rotates gear 52 and barrel cam 54 clockwise as viewed in FIGS. 2 and 5 so that follower 74 and column 82 are moved up by surface 124 of slot 70. Just before roller 94 reaches position 118, roller 72 reaches the top surface 128 and upward travel of column 82 and arm 12 terminates. When roller 94 reaches position 118, it engages with slot 108 to rotate wheel 96, sleeve 60, follower 74, column 82, and arm 12 clockwise as viewed in FIGS. 1, 2 and 5. While roller 94 moves from position 118 to position 120, approximately 90 degrees, barrel cam 54 is also rotated 90 degrees by gears 42, 52. However, it is noted that the angular speed of wheel 96, sleeve 60, follower 74, column 82, and arm 12 is not identical to the constant angular speed of gear 52 and barrel cam 54. When roller 94 enters slot 108, wheel 96 is accelerated from a stopped position to its maximum speed when roller 94 has moved to its radially inner limit in slot 108, and then decelerated as roller 94 moves out of slot 108. Wheel 96 is at its maximum velocity in the position shown in FIG. 5. To compensate for the relative acceleration and deceleration between follower 74 and barrel cam 54, intermediate surfaces 128 of slot 70 are flat for approximately 22 degrees.

When rack 30 has completed one-half of its axial travel, the parts are in the following positions: arm 12 has rotated forty-five (45) degrees as illustrated in broken lines at numeral 142 (FIG. 1); barrel cam 54 has rotated one hundred thirty-five (135) degrees from the position shown in FIGS. 2 and 4; roller 72 is at the top of slot 70 (FIG. 3); column 82 and arm 12 are at their upper limit (FIG. 3); roller 94 is at its inner radial limit in slot 108 (FIG. 5); and sleeve 60, cam 54, and column 82 are rotated forty-five (45) degrees clockwise from the positions shown in FIGS. 1 and 2. After roller 94 passes position 120, as rack 30 continues to move to the right as viewed in FIGS. 2 and 4 roller 94 moves counterclockwise as viewed in FIG. 5 from position 120 toward position 122, surface 112 slides relative to surface 105 so that wheel 96, sleeve 60, cam 54, column 82, and arm 12 do not rotate; and gear 52 and cam 54 rotate clockwise as viewed in FIG. 5 so that surface 126 shifts follower 74, column 82 and arm 12 down. Movement of the transfer arm is terminated when rack 30 has moved to an extreme right position as viewed in FIGS. 2 and 4. This extreme position is set by the position of stop 32 and conventional means for controlling air cylinder 26 and the stroke of rack 30. Jaws 136 are then opened by de-energizing cylinder 140 to deposit part 14 at the unload station 20 and complete the transfer operation. Cylinder 26 is then actuated to move rack 30 to the left as viewed in FIGS. 2 and 4, causing the parts to operate in the reverse direction and sequence from those set forth above and thereby return arm 12 to the load position, ready for another transfer operation.

Although the transfer mechanism 10 and operation thereof have been described in connection with a ninety (90) degree indexing operation, it will be apparent to one skilled in the art that obvious modifications can be made to adapt transfer mechanism 10 to a variety of applications requiring other than 90 degree indexing. One or more arms, such as four for a 90-degree index, can be given a continuous rotary indexing, raising and lowering action around the center post by replacing rack 30 with a controlled, intermittent, unidirectional drive for pinion 34. Rack 30 can be moved by a cam, lever or other mechanism that provides a controlled movement. Gear 42, Geneva arm 46, and lock wheel 45 can be driven with a rotary device, such as a chain and sprocket, rotary air motor, hydraulic motor, or a worm and gear.

If arm 46 is modified to carry a second roller trailing roller 94 by ninety (90) degrees and projection 102 has a slot 110, arm 12 can be rotated or indexed for two 90-degree sectors or a total of 180 degrees. Of course, the stroke of rack 30 and the contour of cam slot 70 would be modified so that the raising operation terminates just prior to initiating the indexing operation, and the indexing operation terminates just prior to initiating the lowering operation. Screw 132 may be loosened and arm 12 moved vertically on column 82 to adjust the vertical position of arm 12. The extent of vertical travel may be varied by adjusting the stroke of rack 30 so roller 72 stops at selected distances from ends 123, 127 of slot 70. The speed and extent of vertical travel may be modified by changing the slope and length of surfaces 124, 126.

By providing additional raising and lowering cam surfaces, particularly with a 180 degree indexing, and properly controlling the travel of rack 30, the arm can pick up a part from a load station, place it on a fixture for mechanical operation thereon, and then transfer the part from the fixture to an unload station. Arm 12 may be replaced with a ninety (90) degree double arm for simultaneously indexing two parts sequentially from a load station to an intermediate station for operation on the part and then index the part to a unload station. The pickup device 134 may be a vacuum or magnetic pick-up.

I claim:

1. A transfer mechanism comprising a rotatable and axially movable column adapted to support a transfer arm and impart two directional movements thereto, means for moving said column axially and means for selectively rotating said column, said column moving means comprising a barrel cam disposed concentrically and rotatably about said column and having a cam follower operatively connected to said column, means for rotating said barrel cam, said column rotating means comprising intermittent rotating means operatively connected to said column and means for actuating said last-mentioned means, said barrel cam having a first portion contoured to impart movement to said follower and said column in one direction axially of said column, a second portion contoured to impart movement to said follower and said column in the opposite axial direction, and a portion intermediate said first and second portions to maintain said follower and said column in a selected axial position.

2. A transfer mechanism comprising a rotatable and axially movable column adapted to support a transfer arm and impart two directional movements thereto, means for moving said column axially and means for selectively rotating said column, said column moving means comprising a barrel cam disposed concentrically and rotatably about said column and having a cam follower operatively connected to said column, means for rotating said barrel cam, said column rotating means comprising a Geneva movement having a slotted Geneva wheel non-rotatably connected with said column and a rotatable Geneva arm having a projection thereon which intermittently engages with the slot in said wheel, said column being spaced concentrically from and supported by a stationary post, and including a sleeve disposed concentrically between said post and said column and rotatably supported by said post, said follower being slidably and non-rotatably connected to said sleeve and fixedly mounted on said column, said barrel cam being rotatable about said sleeve and said Geneva wheel being non-rotatably connected to said sleeve.

3. A transfer mechanism comprising a rotatable and axially movable column adapted to support a transfer arm and impart two directional movements thereto, means for moving said column axially and means for selectively rotating said column, said column moving means comprising a barrel cam disposed concentrically and rotatably about said column and having a cam follower operatively connected to said column, means for rotating said barrel cam, said column rotating means comprising a Geneva movement having a slotted Geneva wheel non-rotatably connected with said column and a rotatable Geneva arm having a projection thereon which intermittently engages with the slot in said wheel, said barrel cam having a first portion contoured to impart movement to said follower and said column in one direction axially of said column, a second portion contoured to impart movement to said follower and said column in the opposite axial direction, and a portion intermediate said first and second portions for maintaining said follower and said column in a selected position, said Geneva arm being rotatable through first, second, and third sectors, said projection engaging with said slot in said wheel when said arm is rotated through said second sector, said actuating means being arranged to rotate said arm through said first sector when said cam follower engages said first contour portion, rotate said arm through said second sector when said cam follower engages said intermediate contour portion, and rotate said arm through said third sector when said cam follower engages said second contour portion.

4. In combination a base, a stationary vertical post mounted on said base, a hollow column rotatably and shiftably supported by said post, said column being adapted to support a transfer arm and impart two directional movements thereto, means for axially shifting said column from a first vertical position to a second vertical position and from said second position to said first position, means for selectively rotating said column while said column is at one of said vertical positions, said column being spaced concentrically about said post, and a sleeve disposed concentrically between said post and column, said column shifting means comprising a barrel cam disposed concentrically and rotatably about said column, said barrel cam having a cam follower fixably mounted on said column and slidably but non-rotatably mounted on said sleeve, said column rotating means comprising a Geneva movement having a Geneva wheel non-rotatably mounted on said sleeve for imparting rotation to said column through said sleeve and said cam follower.

5. A work transfer mechanism comprising a support, a column mounted on said support for axial reciprocation and for rotation about its axis of reciprocation, a transfer arm on said column, a cam concentric with said column and journalled on said support for rotation about said axis of the column, a cam follower fixed against rotation relative to said column and operatively associated with said cam, means for intermittently locking said column against rotation, means for rotating said cam such that when the column is locked against rotation and the cam is rotated, the column is shifted axially by reason of the interengagement of the cam and cam follower, and means for rotating said column while said cam is being rotated whereby to swing said arm about the axis of the column.

6. The combination called for in claim 5 wherein the speed of rotation of the column and the speed of rotation of the cam are different and wherein the cam has a straight surface cam portion lying in a plane perpendicular to the axis of the column which permits relative rotation between the cam and the column without shifting the column axially when the column and cam are being rotated simultaneously at different speeds.

7. The combination called for in claim 5, wherein said cam comprises a barrel cam in the form of a cylindrical sleeve surrounding said column, said cam follower projecting radially of the column into engagement with a cam groove in said sleeve.

8. The combination called for in claim 5, wherein said means for rotating said column includes a Geneva wheel operatively connected with said column, said wheel having at least one radially extending slot and at least two radial projections spaced circumferentially from said slot on opposite sides thereof, the peripheral portion of the wheel between said slot and said projections comprising concave circular segments, a driver for said Geneva wheel comprising a disc journalled for rotation on an axis parallel to the axis of rotation of the wheel and having at least one arm thereon adapted to engage the slot in the Geneva wheel to rotate the wheel through a pre-determined circular arc and also having a circular peripheral portion adapted to interfit with said concave circular segments on the Geneva wheel to prevent rotation of the Geneva wheel when the arm is not engaged with the slot.

9. The combination called for in claim 5 including a sleeve interposed between said column and said cam, said sleeve being axially slidable relative to the column and having an axially slidable connection with the cam follower, said means for rotating said column having a driving connection with said sleeve whereby when said last-mentioned means are operated said sleeve rotates said column through its sliding connection with said cam follower.

10. The transfer mechanism set forth in claim 1 wherein said first and second contoured portions are inclined in opposite directions, said intermediate cam portion is at the apex for said first and second portions, and said intermediate portion is flat to compensate for selective acceleration and deceleration between said barrel cam and said column.

11. The combination set forth in claim 4 wherein said Geneva wheel has a slot therein, said Geneva movement has a rotatable Geneva arm having a projection thereon, said Geneva arm being rotatable through first, second, and third sectors, said projection being geared with said slot when said arm is rotated through said second sector, said barrel cam having first, second and third camming surfaces for respectively shifting said column from said first to said second position, maintaining said column in said second position and shifting said column from said second position to said first position, gear means for rotating said barrel cam, and means for driving said gear means and said Geneva arm whereby when said Geneva arm moves through said first sector said barrel cam rotates to shift said column from said first to said second position, when said Geneva arm is rotated through said second sector said column is in said second position, and when said Geneva arm rotates through said third sector said barrel cam shifts said column from said second to said first position.

References Cited by the Examiner

UNITED STATES PATENTS

| 957,024 | 5/1910 | Wyman | 74—20 |
|---|---|---|---|
| 2,550,920 | 5/1951 | Gilbert. | |
| 2,811,267 | 10/1957 | Bock. | |
| 3,112,134 | 11/1963 | Ponsen | 214—151 X |

FOREIGN PATENTS 650,027   9/1937   Germany.

MARVIN A. CHAMPION, *Primary Examiner.*